United States Patent
Bertz et al.

(10) Patent No.: US 9,712,571 B1
(45) Date of Patent: Jul. 18, 2017

(54) ACCESS LEVEL DETERMINATION FOR CONFERENCE PARTICIPANT

(71) Applicant: Sprint Spectrum L.P., Overland Park, KS (US)

(72) Inventors: Lyle T. Bertz, Lee's Summit, MO (US); Joao C. Teixeira De Magalhaes, Shawnee, KS (US); Von K. McConnell, Leawood, KS (US); Lyle W. Paczkowski, Mission Hills, KS (US); Stephen J. Bye, Atlanta, GA (US)

(73) Assignee: Sprint Spectrum L.P., Overland Park, KS (US)

(*) Notice: Subject to any disclaimer, the term of this patent is extended or adjusted under 35 U.S.C. 154(b) by 205 days.

(21) Appl. No.: 14/333,034

(22) Filed: Jul. 16, 2014

(51) Int. Cl.
| | |
|---|---|
| *H04L 29/06* | (2006.01) |
| *H04L 12/18* | (2006.01) |
| *H04M 3/56* | (2006.01) |
| *H04N 7/15* | (2006.01) |

(52) U.S. Cl.
CPC ...... *H04L 65/1093* (2013.01); *H04L 65/4038* (2013.01); *H04L 12/1813* (2013.01); *H04M 3/56* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 2010/0296634 A1* | 11/2010 | Schulzrinne | H04M 3/5116 379/45 |
| 2012/0020468 A1* | 1/2012 | Boss | H04L 12/1822 379/202.01 |
| 2012/0304078 A1* | 11/2012 | Ramaswamy | H04M 3/42365 715/753 |

* cited by examiner

*Primary Examiner* — Vinncelas Louis (57) ABSTRACT

A method and system are provided for admitting new participants to an ongoing conference session. In one example, a conference server hosting a conference session may receive a request for a UE to join the ongoing conference session. In response to receiving such a request, the conference server may determine whether to admit the UE to the ongoing conference session as a full participant or as a partial participant. When the conference server determines to admit the UE as a full participant, the conference server establishes a conference leg with the UE and permits the UE to communicate with each and every current participant of the ongoing conference session. However, when the conference server determines to admit the UE as a partial participant, the conference server may establish a conference leg with the UE and may permit the UE to communicate with just some of the ongoing conference's current participants.

17 Claims, 5 Drawing Sheets

ACCESS LEVEL DETERMINATION FOR CONFERENCE PARTICIPANT

BACKGROUND

In typical cellular wireless communication systems, user equipment devices (UEs) (e.g., cell phones, personal digital assistants, laptops, netbooks, tablets, and/or other wirelessly equipped devices) subscribe to service from a given cellular wireless service provider. A service provider may operate one or more networks (sometimes referred to as radio access networks (RANs)) that include base stations that radiate to define one or more wireless coverage areas (e.g., sectors) in which the subscriber UEs can operate.

Generally, wireless communications between a given UE and a serving base station in a RAN are carried out in accordance with one or more air interface protocols such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1xRTT and 1xEV-DO), GSM, GPRS, UMTS, EDGE, iDEN, TDMA, AMPS, MMDS, WIFI, and BLUETOOTH, or others now known or later developed. Through each base station (and corresponding RAN), a UE can obtain connectivity to other networks, such as the public switched telephone network (PTSN) and the Internet. In addition to base stations, each RAN may include one or more radio network controllers (RNCs), or the like, which may be integrated with or otherwise in communication with the base stations, and which may include or be in communication with a switch or gateway that provides connectivity with one or more transport networks. With this arrangement, a UE that is positioned within coverage of the RAN may communicate with a base station and in turn, via the base station, with other served devices or with other entities on the transport network.

Some wireless service providers provide additional functionality to establish and host real-time media conferences over a packet-switched (or circuit-switched) network between multiple UEs. A conference server, such as a multipoint conference unit (MCU) for instance, can reside functionally in the network and can operate as a bridging or switching device between the participating stations, to support the conference session.

A participating UE may initiate a conference session by sending to the conference server a session setup message that identifies the other desired participant(s). The server may then seek to connect each of the designated other participants, such as by forwarding the session setup message or sending a new session setup message to each other party. Ultimately, the server would establish a conference leg with each participating UE, including the initiating UE, and the server would then bridge the legs together so that the UEs can communicate with each other. The communications between the UEs could involve voice, video, and/or other media that is exchanged in real-time via the server. A signaling mechanism such as Session Initiation Protocol (SIP) could be used to initialize the conference and to set up each conference leg. Further, digitized media could be packetized and carried between each participating UE, for example, using the Real-time Transport Protocol (RTP) or other protocol or mechanism.

OVERVIEW

Disclosed herein is a method and system for admitting new participants to an ongoing conference session. In accordance with one embodiment of the method, the conference server hosting the conference session may receive a request for a UE to join the ongoing conference session. In response to receiving such a request, the conference server may determine whether to admit the UE to the ongoing conference session as a full participant or as a partial participant. When the conference server determines to admit the UE as a full participant, the conference server may establish a conference leg with the UE and permit the UE to communicate with each and every current participant of the ongoing conference session. However, when the conference server determines to admit the UE as a partial participant, the conference server may establish a conference leg with the UE and may permit the UE to communicate with some, but not all, of the ongoing conference's current participants. In other words, when admitting the UE as a partial participant to an ongoing conference, the conference server may prevent the UE from communicating with one or more particular participants that constitute a designated subset of the conference's current participants.

In order to determine whether a given UE should be admitted to an ongoing conference session as a full participant or a partial participant, the conference server may refer to a set of conference rules stored at or otherwise accessible to the conference server. In some embodiments of the method, the conference rules may specify that a conference session is designated with a particular privacy level, such as "private" or "open." Similarly, in some embodiments of the method, the conference rules may specify that the given UE is assigned a particular permission level, such as "invitee" or "third-party." The conference server may determine whether to admit the given UE to the ongoing conference session as a full participant or a partial participant based on just the privacy level of the ongoing conference session, based on just the permission level of the given UE, or based on both the privacy designation of the ongoing conference session and the permission level of the given UE.

The conference server may prevent a partial-participant UE from communicating with the one or more particular participants in the designated subset in different ways. In one example, the conference server may permit communications from the UE to the one or more particular participants but prevent communications from the one or more particular participants to the UE. This would allow the one or more particular participants to hear the UE but the UE would not be able to hear any of the one or more particular participants. In another example, the conference server may permit communications from the one or more particular participants to the UE but prevent communications from the UE to the one or more particular participants. This would allow the UE to hear each of the one or more particular participants but each of the one or more particular participants would not be able to hear the UE. In another example, the conference server may prevent all communications to the UE from the one or more particular participants and all communications from the one or more particular participants to the UE.

These as well as other aspects, advantages, and alternatives will become apparent to those of ordinary skill in the art by reading the following detailed description with reference where appropriate to the accompanying drawings. Further, it should be understood that the description in this overview section and elsewhere in this document is not intended to be limiting but is merely provided to illustrate the concept by way of example.

DETAILED DESCRIPTION

1. Example Communication System Architecture

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in data storage or another medium such as a non-transitory machine-readable medium.

At a general level, an example wireless communications system includes a RAN with at least one base station configured to communicate with suitably-equipped UEs that are positioned within coverage of the base station. Such UEs may engage in wireless communication over an air interface with the base station and may thereby communicate with remote entities on a packet-switched network(s), such as the Internet, and/or with other UEs served by the RAN. Generally, a RAN may communicate with subscriber UEs over an air interface according to one or more agreed air interface protocols, examples of which include any and all of the protocols described above. For example, in a UMTS system configured to operate according to LTE standards, the base station is usually referred to as an eNodeB or an eNB. In a CDMA system configured to operate according to the IS-2000 standard (sometimes referred to as 1×RTT) or the IS-856 standard (sometimes referred to as 1×EV-DO), the base station is usually referred to as a Base Transceiver Station (BTS) and is usually under the control of a Base Station Controller (BSC). Other architectures and operational configurations of a RAN are possible as well.

Figure 1:
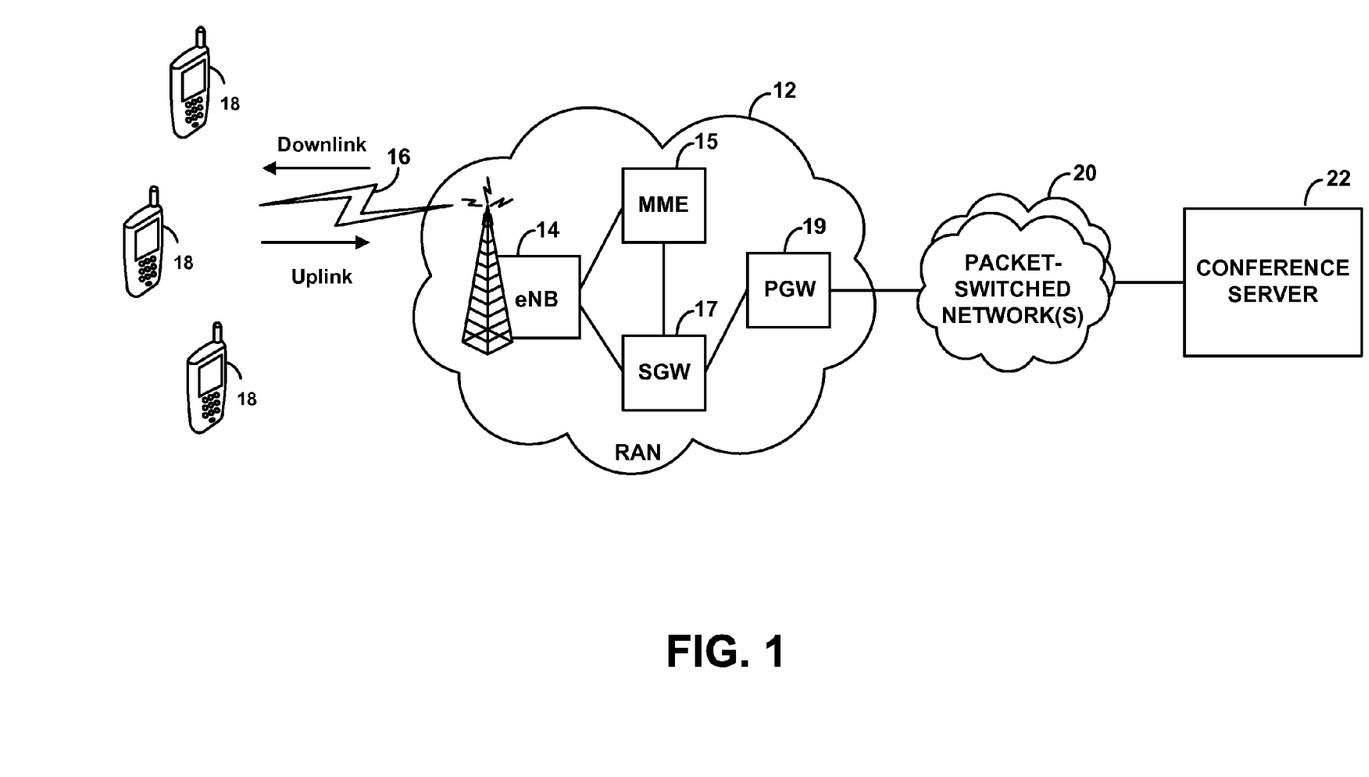
FIG. 1 is a simplified block diagram of a network in which the present method may be implemented.

At a more complex level, but still by way of example, the example wireless communication system depicted in FIG. 1 includes a RAN 12 with an eNodeB (eNB) 14 that radiates to define a wireless air interface 16 over which the eNB 14 may communicate with at least one UE 18. The eNB 14 is shown coupled to various RAN backhaul entities, such as an MME 15 that typically coordinates bearer services (e.g., the establishment, maintenance, and release of bearer services) as well as the tracking and paging of subscriber UEs operating in RAN 12. The eNB 14 is also communicatively coupled to an SGW 17, which may in turn be communicatively coupled to a PGW 19 that connects with one or more packet-switched networks 20, such as the Internet. SGW 17 may perform various administrative functions including maintaining bearer-service information for a given UE, including when the UE is in an idle state. PGW 19 generally functions to enforce QoS requirements, approve and/or direct the establishment of bearer services, and filter downlink data into pertinent bearer services. The interface (physical or logical network connection) between MME 15 and SGW 17 is known as an S11 interface, the interface between MME 15 and eNB 14 is known as an S1-MME interface, the interface between SGW 17 and eNB 14 is known as an S1-U interface, and the interface between the eNB 14 and other eNBs (not shown) in the RAN is known as an X2 interface.

As further shown in FIG. 1, a conference server 22 sits as a node on the packet-switched network 20 (or is otherwise accessible via the packet-switched network 20). Conference server 22 generally functions to facilitate real-time communication between two or more entities. Through known procedures, a UE 18 may engage in communication with the conference server though RAN 12 and the packet-switched networks 20 so as to participate in a conference with one or more other UEs that are also engaged in communication with the conference server 22. In particular, a UE 18 may establish a radio link traffic channel to communicate with RAN 12 and a point-to-point protocol data link connection with the PGW 19, thereby acquiring an IP address (e.g., mobile-IP address) for communicating on the packet-switched network 20, so as to engage in signaling and/or bearer communication with entities such as conference server 22.

To facilitate a conference between two or more UEs, the conference server 22 may contain or otherwise have access to a set of conference rules that define which UEs are entitled to join the conference as full participants, which UEs are just entitled to join the conference as partial participants, and which UEs are not entitled to join the conference at all. Full participants of a conference may be entitled to communicate with all of the other conference participants, whereas partial participants may just be entitled to communicate with some subset of the other conference participants. Conference rules may define other rules for facilitating a conference as well.

Although not shown, it is also possible that a circuit-switched link could be provided for a client device to communicate with the conference server. For instance, RAN 12 may include additional network entities (not shown) that provide a PSTN link through which a UE could engage in a legacy circuit-switched call with the conference server 22. Thus, a given UE (or all UEs, for that matter) could participate in a conference through a circuit-switched communication path just as well as a packet-switched communication path. Further, combinations of circuit-switched and packet-switched communications could be used as well.

The network elements of RAN 12 may be communicatively coupled to one or more additional network entities to assist in the performance of any of the functions described herein. For instance, MME 15 may be communicatively coupled to a Home Subscriber Server (HSS) (not shown), which may contain various subscription data used to facilitate allocation of bearer services including QoS parameters, by the MME. Further, PGW 19 may be communicatively coupled to a Policy Control and Charging Rules Function (PCRF) (not shown), which may provide QoS authorization functions (e.g., QoS class identifiers and/or bitrates) and may ensure that a given QoS is in accordance with a given UE's subscription profile.

As further shown in FIG. 1, the air interface 16 generally defines an uplink that carries wireless communications from the RAN 12 to the UEs 18 and a downlink that carries wireless communications from the UEs 18 to the RAN 12. Depending on the protocol, these links may be structured in various ways. At a high level, for instance, the eNB 14 may provide service on one or more frequency channels and in one or more frequency bands, with downlink communications occupying one band and uplink communications occupying another band. Alternatively, downlink and uplink communications may be carried out on a common frequency band and may be differentiated through time division multiplexing and/or other techniques.

2. Example Communication Server

Figure 2:
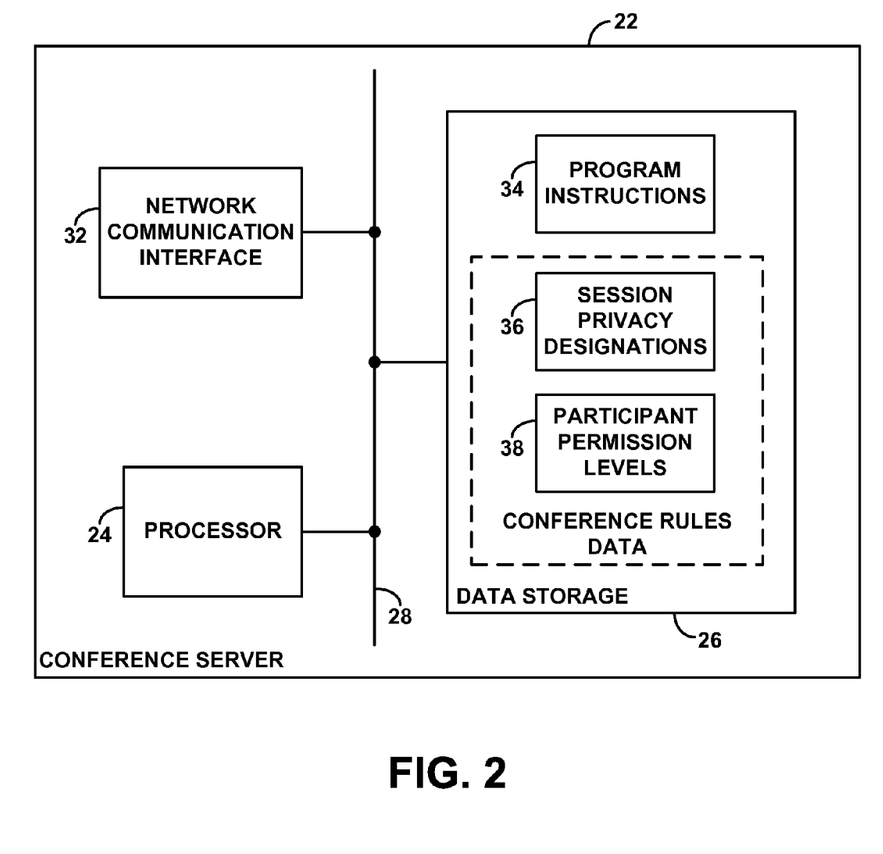
FIG. 2 is a simplified block diagram of a conference server that could implement the present method.

FIG. 2 is a simplified block diagram depicting components that may be included in an example conference server 22. Conference server 22 may be a stand-alone device, such as the way conference server 22 is depicted in FIG. 1; alternatively, conference server 22 may be representative of functionality that is integrated in another network entity, such as an eNB, a BTS, an access node, an access point, a Node-B, a femtocell, a microcell, a picocell, an MME, or some other entity associated with RAN 12. As shown in FIG. 2, the conference server 22 may include a network communication interface 32, a processor 24, and data storage 26, all of which may be coupled together by a system bus, network or other connection mechanism 28.

More specifically, but still by way of example, network communication interface 32 may generally be any wired (e.g., Ethernet) or wireless (e.g., WiFi) interface over which the conference server can transmit and receive data with another entity. For instance, network communication interface 32 may be communicatively coupled to one or more entities on packet-switched network 20 in order to communicate with RAN 12.

Processor 24 may comprise one or more general purpose processors (e.g., microprocessors) and/or special-purpose processors (e.g., digital signal processors and/or application specific integrated circuits) and may be integrated in whole or in part with the network communication interface. Data storage 26 may comprise one or more volatile and/or non-volatile storage components, such as a non-transitory computer-readable medium, and may be integrated in whole or in part with processor 24. Some examples of non-transitory computer-readable media include a hard disk drive, a Compact Disc (CD), a Digital Video Disk (DVD), a digital tape, a flash memory, although others are possible.

As further shown, data storage 26 may hold program instructions 34, which may be executable by processor 24 to carry out various functions described herein. For instance, in accordance with the program instructions 34, the processor 24 may engage in conference bridging and management functionality, in accordance with applicable communication protocols such as SIP, H.323, RTP, and/or various codecs (e.g., G.723.1 and others). As such, the program instructions 34 may be executable to engage in SIP signaling so as to establish a conference session and set up RTP conference legs with two or more conference participants (e.g., UEs), to bridge those legs together so as to enable the participants to communicate with each other, and to manage floor control (if applicable) in the conference.

Additionally in accordance with the program instructions 34, the processor 24 may function to receive a request for a UE to join an ongoing conference session. The processor 24 may determine whether to admit the UE to the ongoing conference session as a full participant or as a partial participant. If the processor determines to admit the UE to the ongoing conference session as a full participant, then the processor 24 may admit the UE to the ongoing conference session with the ability to communicate with each of the current participants of the ongoing conference session. However, if the processor determines to admit the UE to the ongoing conference session as a partial participant, then the processor 24 may admit the UE to the ongoing communication session with an inability to communicate with some subset of the current participants of the ongoing conference session.

To facilitate the determination of whether to admit the UE to the ongoing conference session as a full participant or a partial participant, data storage 26 may include conference rules data that contain session privacy designations 36 and participant permission levels 38. Session privacy designations 36 may store an indication of a privacy level assigned to the ongoing conference session. In some embodiments of the present method, the ongoing conference session may be designated with a privacy level of "private" or "open." Thus, the session privacy designations 36 may contain an indication of which privacy level the ongoing conference is designated as. However, in other embodiments, the ongoing conference session may be designated with other privacy levels, such as "high," "medium," or "low," or any other type or name of privacy level.

Additionally, participant permission levels 38 may store an indication of a permission level assigned to a given UE. In some embodiments of the present method, a UE may be assigned a permission level of "normal" or "emergency." Thus, the participant permission levels 38 may contain an indication of which permission level the UE is assigned to the UE. However, in other embodiments, a UE may be designated with other permission levels, such as "invitee," or "third-party," or any other type or name of privacy level.

In accordance with program instructions 34, processor 24 may refer to the conference rules data in order to determine whether to admit a UE to an ongoing conference session as a full participant or as a partial participant. In some embodiments of the present method, processor 24 may refer to just session privacy designations 36, and based on the privacy designation of the ongoing communication session, processor 24 may determine whether to admit the UE to the ongoing conference session as a full participant or a partial participant. In other embodiments, processor 24 may refer to just participant permission levels 38, and based on the permission level to the UE, processor 24 may determine whether to admit the UE to the ongoing conference session as a full participant or a partial participant. And in still other embodiments, processor 24 may first refer to one of session privacy designations 36 and participant permission levels 38 and based on the data retrieved there may next refer to the other of session privacy designations 36 and participant permission levels 38, and based on the data retrieved there determine whether to admit the UE to the ongoing conference session as a full participant or a partial participant. Other functionality is possible as well.

3. Example User Equipment

Figure 3:
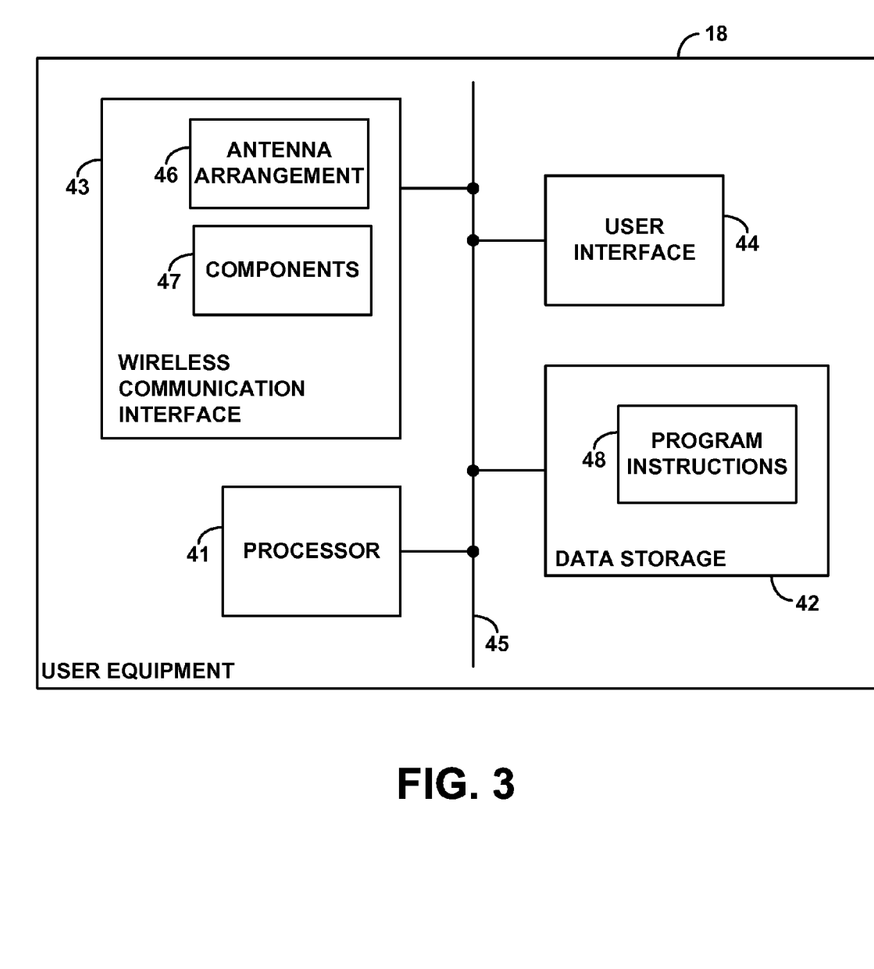
FIG. 3 depicts an example user equipment device arranged to implement the present method.

FIG. 3 is a simplified block diagram of a representative UE 18 (also possibly referred to as a mobile station, access terminal, a wireless communication device, or the like), such as a cellular telephone, wirelessly equipped tablet or personal computer, embedded wireless communication module, for instance. As shown, the representative UE may include a wireless communication interface 43, a user interface 44, a processor 41, and data storage 42, all of which may be coupled together by a system bus, network, or other connection mechanism 45.

Wireless communication interface 43 may comprise an antenna arrangement 46 and associated components 47, for engaging in communication with serving base stations, such as to transmit data and control information to the base stations and to receive data and control information from the base stations. For instance, the components 47 may include a mobile station modem, such as an MSM-series chipset. However, other modules that support other protocols are possible as well.

User interface 44 may facilitate interaction with a user of the UE if applicable. As such, the user interface may include output components such as a display screen, loudspeaker, and headphone jack, and input components such as a keypad, a touch-sensitive screen, and a camera.

Processor 41 may comprise one or more general purpose processors and/or special-purpose processors and may be integrated in whole or in part with wireless communication interface 43. Data storage 42 may comprise one or more volatile and/or non-volatile storage components, such as a non-transitory computer-readable medium, and may be integrated in whole or in part with processor 41. Some examples of non-transitory computer-readable media include a hard disk drive, a Compact Disc (CD), a Digital Video Disk (DVD), a digital tape, flash memory, although others are possible. As shown, data storage 42 may hold program instructions 48, which may be executable by processor 41 to carry out various UE functions described herein.

4. Example Access Level Determination Procedure

As a general matter, a conference server, such as conference server 22, may facilitate a communication session (also referred to herein as a conference session or simply a conference) between two or more UEs. In practice, a UE might initiate a conference session by sending to the communication server a session setup message that identifies the other desired participant(s). The conference server may then seek to connect each of the designated other participants, such as by forwarding the session setup message or sending a new session setup message to each other party. Ultimately, the server would thereby establish a conference leg with each participating UE, including the initiating UE, and the server would then bridge the legs together so that the users at the stations can exchange voice, video and/or other media in real-time via the server. Generally, during an ongoing conference session, the conference server may receive communications from a particular UE and broadcast those received communications to the other participants of the conference session. The conference server may provide additional functionality for the conference participants as well.

Figure 4:
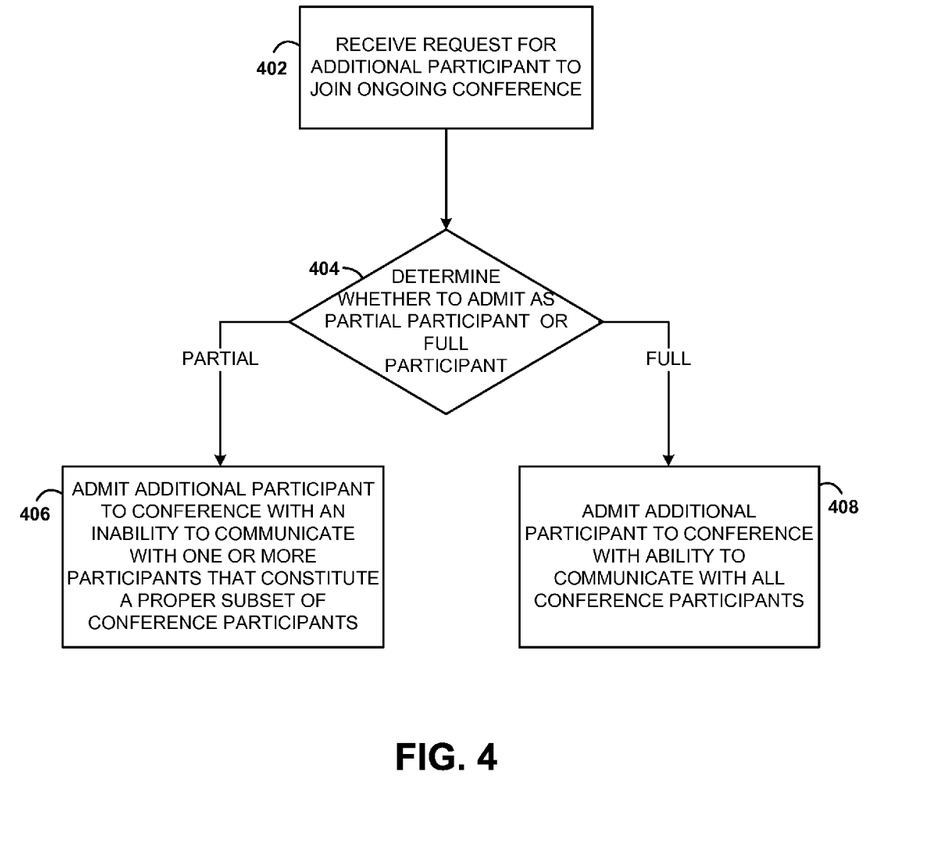
FIG. 4 is a flow chart depicting example functions that can be carried out in accordance with the present method.

FIG. 4 is a flow chart that depicts functions that can be carried out by a conference server, such as conference server 22, in accordance with at least one embodiment of the present method. The flow chart begins at block 402 where the conference server receives a request for an additional participant to join an ongoing conference session facilitated by the conference server 22. In embodiments in which the additional participant is a UE, such as UE 18, the request may contain an identifier of UE 18, such as an MEID, an ESN, a mobile-IP address, or some other identifier of UE 18. The request may also contain an identifier of the ongoing conference, such as a conference ID or the like.

In some embodiments of the method, the request may be generated by one or more of the network entities of RAN 12 (FIG. 1) (such as eNB 14 or MME 15, for instance) and generated in response to some action taken by UE 18 indicative of a desire to join the ongoing conference session. For example, UE 18 may dial a particular number assigned to the ongoing conference session, navigate to a particular web address assigned to the ongoing conference session, transmit an SMS message containing a particular code or other identifier of the ongoing conference session, or otherwise take some action indicative of a desire to join the ongoing conference session. As a result of this, the eNB serving UE 18 (e.g., eNB 14) and/or one or more other network entities may receive a message from UE 18 or otherwise detect the UE's desire to join an ongoing communication session. In response, the eNB and/or the other network entities may generate the request and transmit it to the conference server 22 via the packet-switched network 20. However, in other examples, other ways of generating a request to join an ongoing conference session are possible as well.

Continuing at block 404, the conference server 22 may determine whether to admit UE 18 to the ongoing conference session as a full participant or a partial participant. If the conference server 22 determines to admit UE 18 to the ongoing conference session as a full participant, then the conference server 22 may proceed to block 408 where the conference server 22 admits the UE 18 to the ongoing conference with the ability to communicate with all the conference participants. However, if the conference server 22 determines to admit the UE 18 to the ongoing conference as a partial participant, then the conference server 22 may proceed to block 406 where the conference server 22 may admit the UE 18 to the ongoing conference session with an inability to communicate with one or more participants that constitute a proper subset of the conference participants.

The conference server 22 may provide a UE with the ability to communicate with all conference participants by functioning to transmit to all of the other conference participants any communications received at the conference server 22 from the UE, and likewise, functioning to transmit to the UE any communications received at the conference server 22 from any of the other conference participants. On the other hand, the conference server 22 may limit a UE's ability to communicate with a particular conference participant by functioning to prevent communications received at the conference server 22 from the UE from being transmitted to the particular conference participant, functioning to prevent communications received at the conference server 22 from the particular conference participant from being transmitted to the UE, or both. Other ways of limiting a UE's ability to communicate with a conference participant may be possible as well.

In order to determine whether to admit UE 18 to the ongoing conference session as a full participant or as a partial participant, the conference server 22 may refer to conference rules and, based on the conference rules, determine whether to admit UE 18 to the ongoing conference session as a full participant or a partial participant. As mentioned above, the conference rules may be stored at or otherwise accessible to conference server 22. And such conference rules may contain an indication of a privacy designation of the ongoing conference session, and a permission level assigned to UE 18 and/or the current participants of the ongoing conference session.

In a more particular case, but still be way of example, in some embodiments of the method, the conference rules may indicate that the ongoing communication session is designated with a privacy level of either "private" or "open." However, in other embodiments, the ongoing conference session may be designated with other privacy levels, such as "high," "medium," or "low," or any other type or name of privacy level. In some embodiments of the method, the conference rules may indicate that UE 18 is assigned a permission level of either "invitee" or "third-party." However, in other embodiments, UE 18 may be assigned other permission levels, such as "emergency," "non-emergency," or any other type or name of permission level.

The conference server may determine whether to admit UE 18 to the ongoing conference session as a full participant or as a partial participant based on just the privacy designation of the ongoing conference session, based on just the permission level of the UE 18, or based on both the privacy designation of the ongoing conference session and the permission level of the UE 18. In accordance with an example in which the conference server determines to admit the UE 18 to the ongoing conference session based on just the privacy designation of the ongoing conference session, the conference server may refer to the privacy designation of the ongoing conference session to determine whether the privacy designation of the ongoing conference session is above a certain privacy threshold (e.g., when the privacy designation of the conference session is "private"). When the privacy designation of the ongoing conference session is above the privacy threshold, the conference server may admit UE 18 to the ongoing conference session as a partial participant. However, when the privacy designation is not above the privacy threshold (e.g., when the privacy designation of the conference session is "open"), the conference server may admit UE 18 to the ongoing conference session as a full participant.

In accordance with an example in which the conference server determines to admit the UE 18 to the ongoing conference session based on just the permission level of the UE 18, the conference server may refer to the permission level of the UE 18 to determine whether the permission level of UE 18 is above a certain permission level threshold (e.g., when the permission level of UE 18 is "invitee"). When the permission level of UE 18 is above the permission level threshold, the conference server may admit UE 18 to the ongoing conference session as a full participant. However, when the permission level is not above the permission level threshold (e.g., when the permission level of UE 18 is "third-party"), the conference server may admit UE 18 to the ongoing conference session as a partial participant.

In accordance with an example in which the conference server determines to admit the UE 18 to the ongoing conference session based on both the privacy designation of the ongoing conference session and the permission level of the UE 18, the conference server may first refer to the privacy designation of the ongoing conference session to determine whether the privacy designation of the ongoing conference session is above a certain privacy threshold (e.g., when the privacy designation of the conference session is "private"). When the privacy designation of the ongoing conference session is not above the privacy threshold, the conference server may admit UE 18 to the ongoing conference session as a full participant. However, when the privacy designation is above the privacy threshold (e.g., when the privacy designation of the conference session is "private"), the conference server may then refer to the permission level of the UE 18 to determine whether the permission level of UE 18 is above a certain permission level threshold (e.g., when the permission level of UE 18 is "invitee"). When the permission level of UE 18 is above the permission level threshold, the conference server may admit UE 18 to the ongoing conference session as a full participant. However, when the permission level is not above the permission level threshold (e.g., when the permission level of UE 18 is "third-party"), the conference server may admit UE 18 to the ongoing conference session as a partial participant.

In accordance with another example in which the conference server determines to admit the UE 18 to the ongoing conference session based on both the privacy designation of the ongoing conference session and the permission level of the UE 18, the conference server may first refer to the permission level of the UE 18 to determine whether the permission level of UE 18 is above a certain permission level threshold (e.g., when the permission level of UE 18 is "invitee"). When the permission level of UE 18 is above the permission level threshold, the conference server may admit UE 18 to the ongoing conference session as a full participant. However, when the permission level is not above the permission level threshold (e.g., when the permission level of UE 18 is "third-party"), the conference server may then refer to the privacy designation of the ongoing conference session to determine whether the privacy designation of the ongoing conference session is above a certain privacy threshold (e.g., when the privacy designation of the conference session is "private"). When the privacy designation of the ongoing conference session is not above the privacy threshold, the conference server may admit UE 18 to the ongoing conference session as a full participant. However, when the privacy designation is above the privacy threshold (e.g., when the privacy designation of the conference session is "private"), the conference server may then admit UE 18 to the ongoing conference session as a partial participant.

As described above, when the conference server determines to admit UE 18 to the ongoing conference session as a partial participant, the conference server admits UE 18 to the ongoing conference session with an inability to communicate with some subset of current participants of the ongoing conference session. Thus, when the conference server determines to admit UE 18 to the ongoing conference session as a partial participant, the conference server may engage in an additional determination of which particular conference participants the UE 18 will be unable to communicate with and/or which particular conference participants the UE 18 will be able to communicate with.

In accordance with one example of this determination, the conference server may refer to the conference rules to determine the permission levels of the current participants of the conference. Accordingly, the conference server may admit UE 18 to the ongoing conference session with an inability to communicate with any current participant that has a permission level below a certain permission level threshold (e.g., any permission level below "invitee," such as "third-party"). In another example, the conference server may admit UE 18 to the ongoing conference session with an inability to communicate with any current participant that has a permission level at or below the permission level of UE 18. The conference server may determine which conference participants the UE 18 will be unable to communicate with and which conference participants the UE 18 will be able to communicate with in other ways as well.

Figure 5:
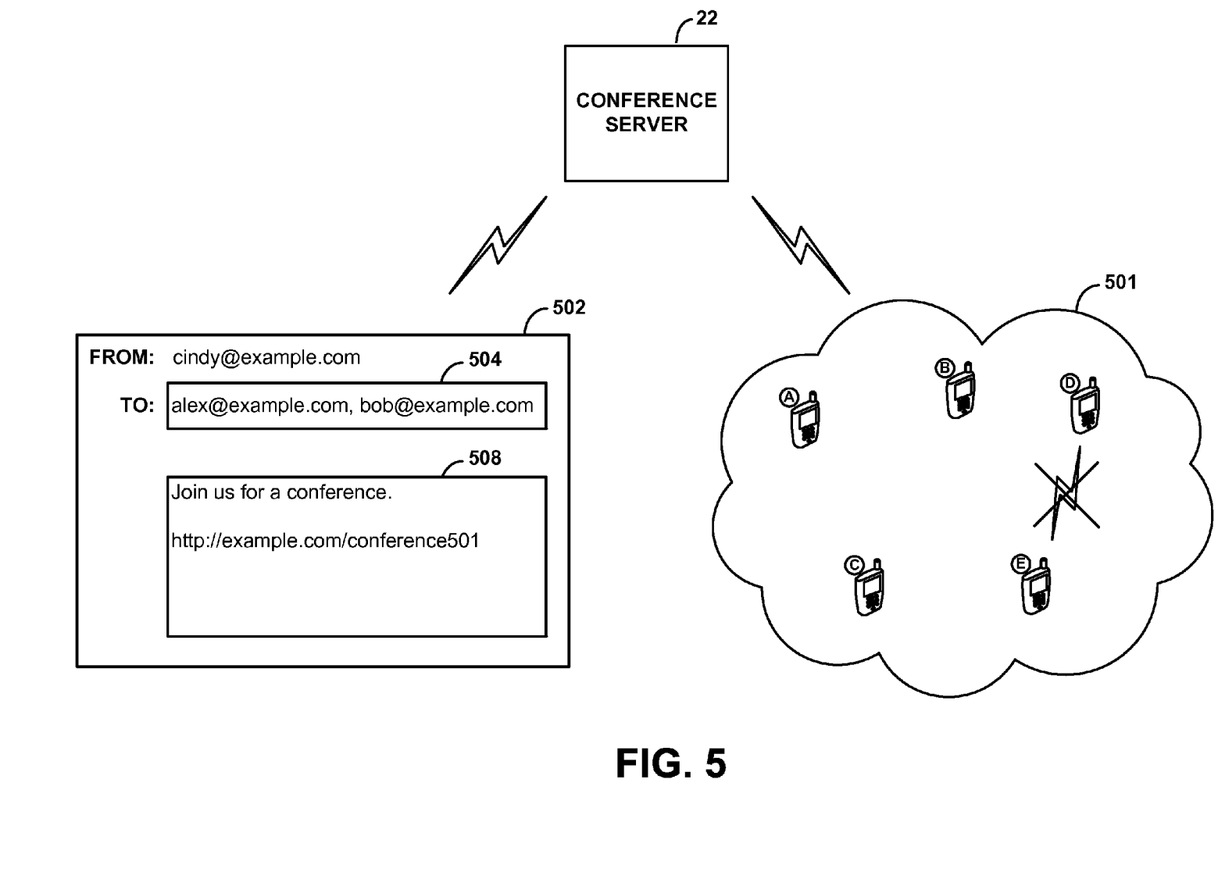
FIG. 5 depicts an example scenario in which the present method may be implemented.

FIG. 5 depicts an example scenario in which conference server 22 facilitates a conference session 501 between UEs A, B, C, D, and E. In the example scenario depicted, the conference server 22 may have received from an initiating UE, say UE C, a conference session setup request message identifying UEs A and B as desired participants of the conference session. In response to receiving this conference session setup request message, conference server 22 may generate a conference session invite message 502 and transmit the message 502 to UEs A and B. In the example scenario depicted, conference session invite message 502 takes the form of an E-mail message, however in other examples, the conference session invite message may take other forms, such as an SMS message, or any other type of message.

As further depicted, conference session invite message 502 may contain an addressable field 504 that may contain E-mail addresses or other identifiers of the desired participants. In particular, addressable field 504 contains "alex@example.com," which may pertain to UE A, and "bob@example.com," which may pertain to UE B. Additionally, conference session invite message 502 may contain a message body 508 that may contain a conference session identifier. In the example scenario depicted in FIG. 5, the message body 508 contains a web address, which when navigated to by a UE or other suitably-equipped device may cause a request message to be generated and forwarded to the conference server. However, in other examples, the message body 508 may contain another type of conference session identifier, such as a telephone number.

In addition to generating a conference session invite message, conference server 22 may store or change a permission level designation of the desired conference participants. As indicated above, conference server 22 may store or otherwise have access to a listing of permission level designations of UEs operating in the network, such as participant permission levels 38 in data storage 26. By default, all UEs operating in a network may initially be designated with low permission levels, such as "third-party." But from time to time, the conference server may change the permission levels of certain UEs. For instance, in response to receiving from UE C a conference session setup request message identifying UEs A and B as desired participants of the conference session, the conference server may change the permission levels of UEs A, B, and C to something higher than the default permission level, which, for instance, may be "invitee." Conference server 22 may change permission levels of UEs for other reasons as well.

As mentioned, when, say, UE A desires to join conference session 501, UE A may navigate to the web address provided in the message body 508 of conference session invite message 502. Doing so may cause a web server or other network entity to generate and forward to conference server 22 a conference admission request message requesting admission for UE A to the ongoing conference session 501. In response to receiving such a request message, conference server 22 may, in accordance with the procedure described above, determine whether to admit UE A to the ongoing conference session 501 as a partial participant or a full participant. Accordingly, in one embodiment of the present method, conference server 22 may refer to the permission levels stored at or otherwise accessible to the conference server 22 to determine whether the permission level of UE A is above a certain permission level threshold (e.g., whether the permission level of UE 18 is "invitee"). The conference server 22 may determine that the permission level of UE A is indeed "invitee" and the conference server 22 may therefore admit UE A to the ongoing conference session 501 as a full participant.

The participants of the ongoing conference session 501 may also desire that additional participants join the ongoing conference session. In the example scenario depicted in FIG. 5, for instance, UE A may desire that a UE D join the ongoing conference session 501 and UE B may desire that a UE E join the ongoing conference session 501. Accordingly, UEs A and B may forward the conference session invite message to UEs D and E or may otherwise inform UEs D and E of the ongoing conference session 501. UEs D and E may then navigate to the web address provided in the message body 508, or take some other action in order to join the conference.

As indicated above, this action may cause a web server or other network entity to generate and forward to conference server 22 a conference admission request message requesting admission for UEs D and E to the ongoing conference session 501. In response to receiving such a request message, conference server 22 may, in accordance with the procedure described above, determine whether to admit UEs D and E to the ongoing conference session 501 as partial participants or as full participants. However, because UEs D and E were not identified as desired participants in the initial conference session setup message or in the conference session invite message 502, the conference server 22 may not have changed the initial permission levels of UEs D and E. Thus, the permission levels of UEs D and E may remain at, for instance, "third-party."

Accordingly, when conference server 22 determines whether to admit UEs D and E to the ongoing conference session 501 as partial participants or a full participants, conference server 22 may refer to the permission levels stored at or otherwise accessible to the conference server 22 and thereby determine that UEs D and E each have the permission level of "third-party." Therefore, conference server 22 may admit UEs D and E to the ongoing conference session 501 as partial participants. That is, the conference server may admit UEs D and E to the ongoing conference session 501 with an inability to communicate with a subset of the conference participants.

As described above, when the conference server determines to admit a UE to an ongoing conference session as a partial participant (and thus admits the UE to the ongoing conference session with an inability to communicate with some subset of participants of the ongoing conference session) the conference server may engage in an additional determination of which conference participants the UE will be unable to communicate with and which conference participants the UE will be able to communicate with. In the example scenario depicted in FIG. 5, when the conference server 22 admits UEs D and E to the ongoing conference session 501, the conference server 22 may additionally refer to the conference rules to determine the permission levels of UEs D and E. Accordingly, the conference server 22 may determine that the permission levels of UEs D and E are, respectively, "third-party." As such, the conference server 22 may admit UEs D and E to the ongoing conference session 501 with an inability to communicate with any participant that has a permission level at or below "third-party." As participants in the conference session 501, UEs D and E would have the ability to communicate with UEs A, B, and C (because the permission levels of UEs A, B, and C are "invitee") but UEs D and E would be unable to communicate with each other (because the permission levels of UEs D and E are "third-party"). Other ways of determining which conference participants a UE will be unable to communicate with and which conference participants the UE will be able to communicate with are possible as well.

5. Conclusion

Various embodiments have been described above. Those skilled in the art will understand, however, that changes and modifications may be made to these embodiments without departing from the scope of the claims.

What is claimed is:

1. A method for use in a communication system in which a communication server manages an ongoing communication session between a plurality of current participants, the method comprising:
   the communication server receiving a request for an additional participant to join the ongoing communication session;
   the communication server determining whether to admit the additional participant to the ongoing communication session as a full participant or a partial participant;
   if the communication server determines that the additional participant should be admitted as the full participant, then the communication server admitting the additional participant to the ongoing communication session with an ability to communicate with each of the current participants during the ongoing communication session; and
   if the communication server determines that the additional participant should be admitted as the partial participant, then the communication server admitting the additional participant to the ongoing communication session with an inability to communicate with one or more particular participants during the ongoing communication session, wherein the one or more particular participants constitute a proper subset of the plurality of current participants; and
   wherein the request for the additional participant to join the ongoing communication session includes an indication that the additional participant requested to join the ongoing communication session via a message having one or more addressable fields, the additional participant and at least one current participant being identified in one of the one or more addressable fields, the method further comprising:
   based on the request the communication server admitting the additional participant to the ongoing communication session with an inability to communicate with any current participant who was not identified in one of the one or more addressable fields of the message.

2. The method of claim 1, wherein the communication server admitting the additional participant to the ongoing communication session with the inability to communicate with one or more particular participants during the ongoing communication session comprises:
   the communication server preventing each of the one or more particular participants from receiving communications from the additional participant.

3. The method of claim 1, wherein the communication server admitting the additional participant to the ongoing communication session with the inability to communicate with one or more particular participants during the ongoing communication session comprises:
   the communication server preventing the additional participant from receiving communications from each of the one or more particular participants.

4. The method of claim 1, wherein the communication server determining whether to admit the additional participant to the ongoing communication session as the full participant or the partial participant comprises:
   the communication server evaluating at least one of: a privacy designation of the ongoing communication session or a permission level of the additional participant; and
   based on the evaluating, the communication server determining whether to admit the additional participant to the ongoing communication session as the full participant or the partial participant.

5. The method of claim 1, further comprising:
   the communication server determining that the ongoing communication session is designated with a particular privacy level and responsively evaluating a permission level of the additional participant; and
   based on the evaluating, the communication server determining whether to admit the additional participant to the ongoing communication session as the full participant or the partial participant.

6. The method of claim 1, further comprising:
   the communication server determining that the additional participant is designated with a particular permission level and responsively evaluating a privacy designation of the ongoing communication session; and
   based on the evaluating, the communication server determining whether to admit the additional participant to the ongoing communication session as the full participant or the partial participant.

7. The method of claim 1, wherein the communication server admitting the additional participant to the ongoing communication session with the inability to communicate with any current participant who was not identified in one of the one or more addressable fields of the message comprises:
   the communication server admitting the additional participant to the ongoing communication session with the inability to communicate with any current participant who was not identified in the same addressable field of the message in which the additional participant was identified.

8. A communication server comprising:
   a network communication interface for sending and receiving communications on a network;
   a processor; data storage; and
   program instructions stored in the data storage and executable by the processor, during an ongoing communication session between a plurality of current participants, to carry out functions including:
   receiving a request for an additional participant to join the ongoing communication session;
   determining whether to admit the additional participant to the ongoing communication session as a full participant or a partial participant;
   if it is determined that the additional participant should be admitted as the full participant, then admitting the additional participant to the ongoing communication session with an ability to communicate with each of the current participants during the ongoing communication session;
   if it is determined that the additional participant should be admitted as the partial participant, then admitting the additional participant to the ongoing communication session with an inability to communicate with one or more particular participants during the ongoing communication session, wherein the one or more particular participants constitute a proper subset of the plurality of current participants; and
   wherein the request for the additional participant to join the ongoing communication session includes an indication that the additional participant requested to join the ongoing communication session via a message having one or more addressable fields, the additional participant and at least one current participant being identified in one of the one or more addressable fields, the program instructions being further executable to carry out functions including:
- based on the request, admitting the additional participant to the ongoing communication session with an inability to communicate with any current participant who was not identified in one of the one or more addressable fields of the message.

9. The communication server of claim 8, wherein admitting the additional participant to the ongoing communication session with the inability to communicate with one or more particular participants during the ongoing communication session comprises:
- preventing each of the one or more particular participants from receiving communications from the additional participant.

10. The communication server of claim 8, wherein admitting the additional participant to the ongoing communication session with the inability to communicate with one or more particular participants during the ongoing communication session comprises:
- preventing the additional participant from receiving communications from each of the one or more particular participants.

11. The communication server of claim 8, wherein determining whether to admit the additional participant to the ongoing communication session as the full participant or the partial participant comprises:
- evaluating at least one of: a privacy designation of the ongoing communication session or a permission level of the additional participant; and
- based on the evaluating, determining whether to admit the additional participant to the ongoing communication session as the full participant or the partial participant.

12. The communication server of claim 8, wherein the program instructions is further executable to carry out functions including:
- determining that the ongoing communication session is designated with a particular privacy level and responsively evaluating a permission level of the additional participant; and
- based on the evaluating, determining whether to admit the additional participant to the ongoing communication session as the full participant or the partial participant.

13. The communication server of claim 8, wherein the program instructions is further executable to carry out functions including:
- determining that the additional participant is designated with a particular permission level and responsively evaluating a privacy designation of the ongoing communication session; and
- based on the evaluating, determining whether to admit the additional participant to the ongoing communication session as the full participant or the partial participant.

14. The communication server of claim 8, wherein admitting the additional participant to the ongoing communication session with the inability to communicate with any current participant who was not identified in one of the one or more addressable fields of the message comprises:
- admitting the additional participant to the ongoing communication session with an inability to communicate with any current participant who was not identified in the same addressable field of the message in which the additional participant was identified.

15. A non-transitory computer-readable medium (CRM) having program instructions stored thereon, which, when executed by a processor, causes the processor to carry out functions comprising:
- receiving a request for an additional participant to join an ongoing communication session between a plurality of current participants;
- determining whether to admit the additional participant to the ongoing communication session as a full participant or a partial participant;
- if it is determined that the additional participant should be admitted as the full participant, then admitting the additional participant to the ongoing communication session with an ability to communicate with each of the current participants during the ongoing communication session; and
- if it is determined that the additional participant should be admitted as the partial participant, then admitting the additional participant to the ongoing communication session with an inability to communicate with one or more particular participants during the ongoing communication session, wherein the one or more particular participants constitute a proper subset of the plurality of current participants;
- wherein the request for the additional participant to join the ongoing communication session includes an indication that the additional participant requested to join the ongoing communication session via a message having one or more addressable fields, the additional participant and at least one current participant being identified in one of the one or more addressable fields, the functions further comprising:
- based on the request admitting the additional participant to the ongoing communication session with an inability to communicate with any current participant who was not identified in one of the one or more addressable fields of the message.

16. The CRM of claim 15, wherein admitting the additional participant to the ongoing communication session with the inability to communicate with one or more particular participants during the ongoing communication session comprises at least one of:
- preventing each of the proper subset of current participants from receiving communications from the additional participant; and
- preventing the additional participant from receiving communications from each of the proper subset of current participants.

17. The CRM of claim 15, wherein determining whether to admit the additional participant to the ongoing communication session as the full participant or the partial participant comprises:
- evaluating at least one of: a privacy designation of the ongoing communication session or a permission level of the additional participant; and
- based on the evaluating, determining whether to admit the additional participant to the ongoing communication session as the full participant or the partial participant.

* * * * *